United States Patent
Jain et al.

(10) Patent No.: US 9,979,641 B2
(45) Date of Patent: *May 22, 2018

(54) METHOD AND SYSTEM FOR SERVICE SWITCHING USING SERVICE TAGS

(71) Applicant: Nicira, Inc., Palo Alto, CA (US)

(72) Inventors: Jayant Jain, Cupertino, CA (US); Anirban Sengupta, Saratoga, CA (US)

(73) Assignee: NICIRA, INC., Palo Alto, CA (US)

( * ) Notice: Subject to any disclaimer, the term of this patent is extended or adjusted under 35 U.S.C. 154(b) by 92 days.

This patent is subject to a terminal disclaimer.

(21) Appl. No.: 14/960,441

(22) Filed: Dec. 7, 2015

(65) Prior Publication Data

US 2016/0087888 A1    Mar. 24, 2016

Related U.S. Application Data

(63) Continuation of application No. 13/891,025, filed on May 9, 2013, now Pat. No. 9,225,638.

(51) Int. Cl.
*H04L 12/28* (2006.01)
*H04L 12/741* (2013.01)
(Continued)

(52) U.S. Cl.
CPC .......... *H04L 45/74* (2013.01); *H04L 12/4633* (2013.01); *H04L 45/306* (2013.01);
(Continued)

(58) Field of Classification Search
CPC ..... H04L 67/10; H04L 45/74; H04L 12/4641; H04L 45/306; H04L 12/4633; H04L 2212/00; H04L 49/20
(Continued)

(56) References Cited

U.S. PATENT DOCUMENTS

| 7,209,977 B2 | 4/2007 | Acharya et al. |
| 7,379,465 B2 | 5/2008 | Aysan et al. |

(Continued)

FOREIGN PATENT DOCUMENTS

| EP | 2426956 | 3/2012 |
| WO | WO 2014/182529 | 11/2014 |

OTHER PUBLICATIONS

International Search Report and Written Opinion for commonly owned International Patent Application PCT/US2014/036275, dated Sep. 25, 2014, listed as item #18 above.

*Primary Examiner* — Man Phan
(74) *Attorney, Agent, or Firm* — Adeli LLP

(57) ABSTRACT

The disclosure herein describes a system, which provides service switching in a datacenter environment. The system can include a service switching gateway, which can identify a service tag associated with a received packet. During operation, the service switching gateway determines a source client, a requested service, or both for the packet based on the service tag, identifies a corresponding service portal based on the service tag, and forwards the packet toward the service portal. The service switching gateway can optionally maintain a mapping between the service tag and one or more of: a source client, a required service, the service portal, and a tunnel encapsulation. The service switching gateway can encapsulate the packet based on an encapsulation mechanism supported by the service portal and forward the packet based on the mapping.

17 Claims, 9 Drawing Sheets

(51) Int. Cl.
*H04L 12/725* (2013.01)
*H04L 29/08* (2006.01)
*H04L 12/931* (2013.01)
*H04L 12/46* (2006.01)

(52) U.S. Cl.
CPC .............. *H04L 49/20* (2013.01); *H04L 67/10* (2013.01); *H04L 12/4641* (2013.01); *H04L 2212/00* (2013.01)

(58) Field of Classification Search
USPC .......... 370/352–389, 401–457; 709/214–235
See application file for complete search history.

(56) References Cited

U.S. PATENT DOCUMENTS

| | | | |
|---|---|---|---|
| 7,406,540 B2 | 7/2008 | Acharya et al. | |
| 8,230,493 B2 | 7/2012 | Davidson et al. | |
| 8,615,009 B1* | 12/2013 | Ramamoorthi | H04L 45/745 370/389 |
| 8,743,885 B2 | 6/2014 | Khan et al. | |
| 8,830,834 B2* | 9/2014 | Sharma | H04L 45/64 370/235 |
| 8,856,518 B2 | 10/2014 | Sridharan et al. | |
| 8,862,883 B2* | 10/2014 | Cherukuri | H04L 63/0272 713/151 |
| 8,971,345 B1* | 3/2015 | McCanne | H04L 47/6215 370/412 |
| 8,989,192 B2* | 3/2015 | Foo | H04L 47/2441 370/392 |
| 9,225,638 B2 | 12/2015 | Jain et al. | |
| 9,225,659 B2* | 12/2015 | McCanne | H04L 47/6215 |
| 2003/0065711 A1 | 4/2003 | Acharya et al. | |
| 2008/0276085 A1 | 11/2008 | Davidson et al. | |
| 2009/0199268 A1 | 8/2009 | Ahmavaara et al. | |
| 2010/0100616 A1* | 4/2010 | Bryson | H04L 63/104 709/223 |
| 2011/0317708 A1* | 12/2011 | Clark | H04L 12/4641 370/395.1 |
| 2012/0140719 A1 | 6/2012 | Hui et al. | |
| 2012/0281540 A1 | 11/2012 | Khan et al. | |
| 2013/0058346 A1 | 3/2013 | Sridharan et al. | |
| 2014/0092914 A1 | 4/2014 | Kondapalli | |
| 2014/0169375 A1 | 6/2014 | Khan et al. | |
| 2015/0156035 A1* | 6/2015 | Foo | H04L 47/2441 370/392 |

* cited by examiner

METHOD AND SYSTEM FOR SERVICE SWITCHING USING SERVICE TAGS

CLAIM OF BENEFIT TO PRIOR APPLICATIONS

This application is a continuation application of U.S. patent application Ser. No. 13/891,025 filed May 9, 2013, now issued as U.S. Pat. No. 9,225,638, which is incorporated herein by reference.

BACKGROUND

The exponential growth of the Internet has made it a ubiquitous delivery medium for a variety of applications. Such applications, in turn, have brought with them an increasing demand for bandwidth. As a result, service providers race to build larger and faster data centers with versatile capabilities. Meanwhile, advances in virtualization technologies have made it possible to implement a large number of virtual machines (VMs) in a data center. These virtual machines can essentially operate as physical hosts and perform a variety of functions such as Web or database servers. Because virtual machines are implemented in software, virtual machines for different customer can coexist in the same physical host. This multi-tenancy capability allows service providers to partition and isolate physical resources (e.g., computing power and network capacity) according to customer needs, and to allocate such resources dynamically.

While virtualization brings unprecedented flexibility to service providers, the conventional multi-tenancy tends to be rigid and cannot readily accommodate the dynamic nature of traffic generated by virtual machines. For example, efficiently addressing diverse service requirements of traffic from a plurality of multi-tenant customers (or clients) with different service requirements can be challenging. To obtain service for its traffic, a virtual machine typically interacts with one or more physical or virtual equipments (can be referred to as service portals). A service portal can provide specific networking services, such as load balancing and firewall service etc, and application services, such as web proxy, mail proxy, authentication proxy, web caching, content proxy etc. In conventional datacenter environments, this interaction can be enabled by configuring the services at several management stations in the network.

One or more service portals can provide a service within or outside of the datacenter environment. Consequently, the network infrastructure comprising switches and routers in the datacenter environment requires service switching for multiple services to reach the desired portals. Service switching refers to the switching of a packet based on its service requirements to a service portal. With today's dynamic nature of the datacenter service and policy deployment, such service switching is an increasingly difficult task.

Because of multi-tenancy, the same network infrastructure is used for forwarding traffic flow belonging to different clients. Traffic for a respective client can be originated from a number of applications running on different virtual machines. Furthermore, different clients may require the network infrastructure to forward traffic belonging to the same application differently. For example, in a multi-tenant environment, the network infrastructure may need to forward web traffic from one client to a web filtering service portal while bypassing web filtering for a second client. In a conventional datacenter, the ability to switch traffic based on the corresponding requested services is typically based on static routing policies toward appliances dedicated for services in the network infrastructure. Consequently, managing and extensive provisioning of individual devices in a network infrastructure to accommodate such diverse service requirements can be tedious and error-prone.

SUMMARY

The disclosure herein describes a system, which provides service switching in a datacenter environment. During operation, the system identifies a source client and a requested service of a received packet and generates a service tag indicating the source client, the requested service, or both. The system forwards the packet and the service tag toward a service switching gateway, thereby allowing the service switching gateway to switch the packet based on the service tag. The system can encapsulate the packet based on the identified source client and the requested service of the packet, incorporates the service tag in the packet encapsulation, and forwards the packet is based on the encapsulation.

The system can include a service switching gateway, which can identify a service tag associated with a received packet. During operation, the service switching gateway determines a source client, a requested service, or both for the packet based on the service tag, identifies a corresponding service portal based on the service tag, and forwards the packet toward the service portal. The service switching gateway can optionally maintain a mapping between the service tag and one or more of: a source client, a requested service, the service portal, and a tunnel encapsulation. The service switching gateway can encapsulate the packet based on an encapsulation mechanism supported by the service portal and forward the packet based on the mapping.

Additionally, upon providing the service to the packet, the service portal can forward the packet back to the service switching gateway. The service switching gateway receives the packet, reconstructs the service tag for the packet, and forwards the packet back to its origination switch. The system can use Generic Routing Encapsulation (GRE) tunneling, Internet Protocol Security (IPsec) tunneling, Virtual Local Area Network (VLAN) encapsulation, and/or Internet Protocol (IP) for encapsulation. The system uses a GRE key, an IPsec Security Parameter Index (SPI), a VLAN tag, and/or IP header options as the corresponding service tag.

BRIEF DESCRIPTION OF FIGURES

In the figures, like reference numerals refer to the same figure elements.

DETAILED DESCRIPTION

Figure 1A:
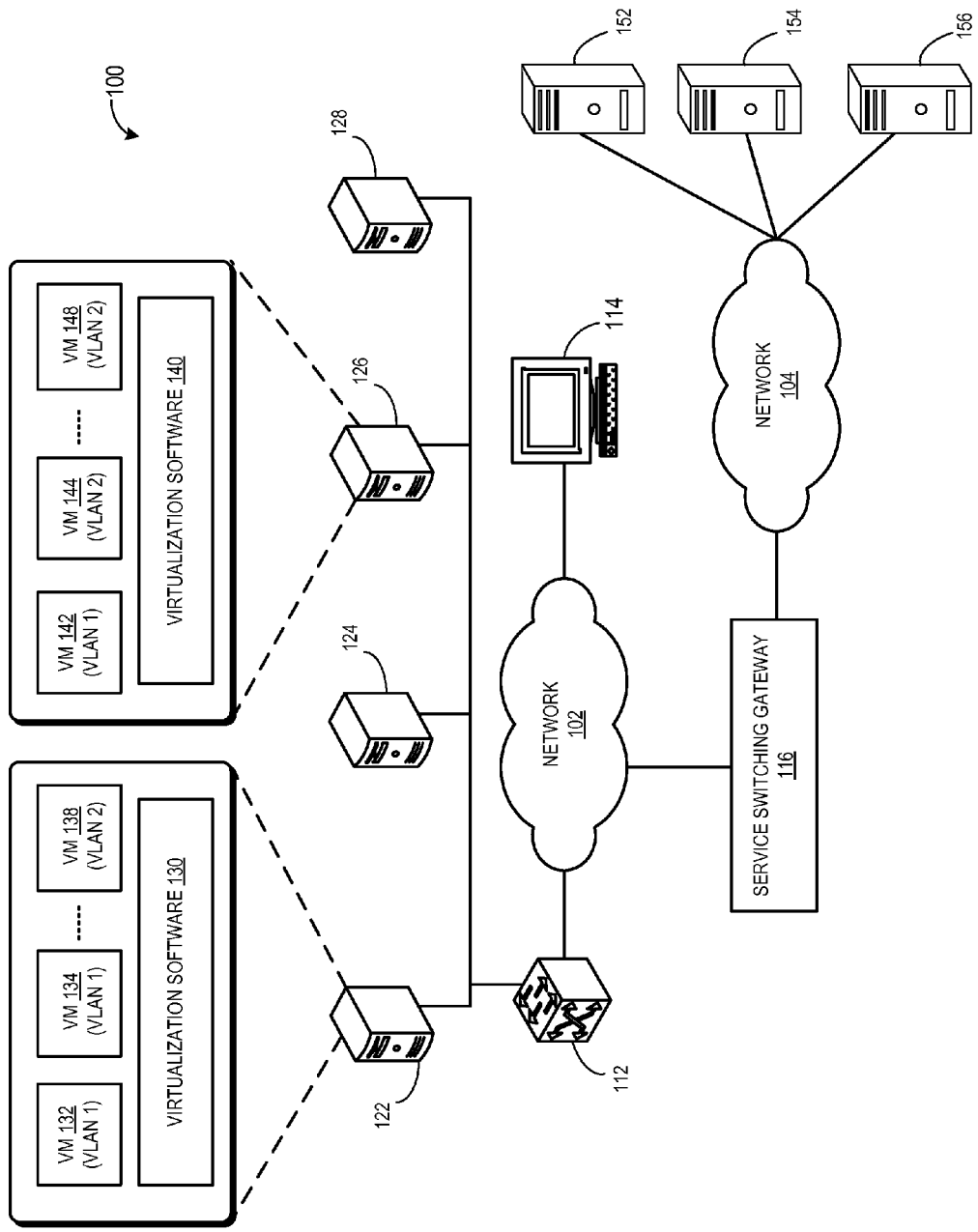
FIG. 1A illustrates an exemplary datacenter environment that facilitates dynamic service switching.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Embodiments of the system disclosed herein solve the problem of dynamically facilitating services to a packet in a multitenant datacenter environment by attaching a service tag to the packet based on its service requirements and switching the packet using the service tag. Because of multi-tenancy, the same network infrastructure of the datacenter environment is used to forward traffic flow belonging to different clients. With existing technologies, standard network protocol stack (e.g., layer-2 and layer-3 of the stack) is typically used by a client in a multi-tenant datacenter environment. For example, the client typically uses its own virtual local area network (VLAN) and Internet Protocol (IP) sub-network (subnet) corresponding to a specific range of IP addresses. As a result, the network protocol stack may not be available for associating virtual machines of different clients with different service requirements. Because different services can be provided from different service portals within or outside of the datacenter, the network infrastructure of the datacenter is burdened with selecting the appropriate service portal. Managing individual devices in the network infrastructure to accommodate such diverse service provisioning can be tedious and error-prone.

To solve this problem, a respective packet in a datacenter environment is associated with a service tag which indicates the source client of the packet and/or the service the packet requires. The client to which the originating virtual machine of the packet belongs is the source client of the packet. In some embodiments, upon receiving the packet, a switch, which can be the first-hop switch, determines the source client, and the requested service and creates the service tag. The switch then encapsulates the packet, includes the service tag as a part of the encapsulation, and sends the encapsulated packet to a service switching gateway. Because this switch originates the service switching in the datacenter environment, the switch can be referred to as the origination switch. The service switching gateway uses the service tag to identify service portal capable of providing the requested service to the packet. In some embodiments, the encapsulation is based on a generic encapsulation mechanism. Upon receiving the packet and the service tag, the service switching gateway decapsulates the packet, identifies the source client and the requested service from the service tag, and forwards the packet to a service portal based on the determination. In some embodiments, the service switching gateway can use a generic encapsulation mechanism to forward the packet to a service portal.

FIG. 1A illustrates an exemplary datacenter environment that facilitates dynamic service switching. Datacenter environment 100 includes a number of host machines 122, 124, 126, and 128. A respective host machine can host a plurality of virtual machines running on virtualization software. For example, host machine 122 and 126 run virtualization software 130 and 140, respectively. A number of virtual machines 132, 134, and 138 run on virtualization software 130, and a number of virtual machines 142, 144, and 148 run on virtualization software 140. In this example, virtual machines 132, 134, and 142 belong to VLAN 1, which is associated with one customer, and virtual machines 138, 144, and 148 belong to VLAN 2, which is associated with another customer.

Datacenter environment 100 also includes a policy server 114, which allows a network administrator to provide service policies regarding different clients and the requested services for different traffic flow type from a respective client. Policy server 114 sends these service policies to an origination switch 112 and a service switching gateway 116 via network 102. In this example, originating switch 112 operates as the origination point of service switching in datacenter environment 100. Note that virtualization software 130 and 140, and/or any networking device in network 102 can operate as an origination point of service switching in datacenter environment 100. Service switching gateway 116 is coupled to service portals 152, 154, and 156 via network 104.

Networks 102 and 104 can be local or wide area networks comprising layer-2 (e.g., Ethernet), layer-3 (e.g., IP), and/or any other networking layers. In some embodiments, networks 102 and 104 are parts of the same network (e.g., same local or wide area network). Based on the service policies received from policy server 114, switch 112 configures forwarding policies by determining which traffic flow type (e.g., web, mail, file transfer, etc) from a client requires which service. Similarly, based on the service policies, service switching gateway 116 configures service switching policies by determining which service portal should the traffic flow be directed to.

During operation, virtual machine 132 generates a packet. The term "packet" refers to a group of bits that can be transported together across a network. "Packet" should not be interpreted as limiting embodiments of the present invention to any specific networking layer. "Packet" can be replaced by other terminologies referring to a group of bits, such as "frame," "message," "cell," or "datagram." Switch 112 receives the packet and determines the source client (i.e., the client to which virtual machine 132 belong) of the packet. Switch 112 can detect the source client based on membership to VLAN 1, an associated subnet and a corresponding IP address range, a source (physical or virtual) port, or any point of attachment between virtual machine 132 and switch 112. Switch 112 also detects the traffic flow type of the packet. Switch 112 can inspect headers of one or more layers (e.g., Ethernet and IP) to determine the traffic flow type. For example, if the packet includes a destination Transmission Control Protocol (TCP) port 80, the packet can be considered as part of a web traffic flow.

Based on the identified source client and the traffic flow type, switch 112 determines the requested service for the packet. Not all clients may require all services. For example, one client may require a web filtering service for all packets while another client may not require any web filtering service. If the packet from virtual machine 132 requires any service, switch 112 creates a service tag, which indicates the source client, the requested service for the packet, or both.

Switch 112 then attaches the service tag with the packet and sends the packet to service switching gateway 116 via one or more hops through network 102. In some embodiments, switch 112 encapsulates the packet using a generic encapsulation mechanism and attaches the service tag as a part of the encapsulation. Examples of packet encapsulation include, but are not limited to, Generic Routing Encapsulation (GRE) tunneling, Internet Protocol Security (IPsec) tunneling, VLAN encapsulation, and IP encapsulation. Examples of corresponding service tag include, but are not limited to, a GRE key, Security Parameter Index (SPI), VLAN tag, and IP header options. If the packet does not require any service, switch 112 forwards the packet based on the destination information in the header of the packet.

Service switching gateway 116 terminates packet encapsulation from switch 112. Because the networking devices in network 102 forwards the packet based on the encapsulation, these devices do not need any modification to assist service switching. Upon receiving the packet and the service tag, service switching gateway 116 extracts the service tag and identifies the source client, the requested service, or both from the service tag. Suppose that service portal 152 can provide the requested service to the packet. Based on the identification, service switching gateway 116 selects service portal 152 for providing the service to the packet. Service switching gateway 116 then sends the packet to service portal 152 via one or more hops through network 104. In some embodiments, service switching gateway 116 encapsulates the packet based on a generic encapsulation mechanism supported by both service switching gateway 116 and service portal 152. After providing the service, service portal 152 can either forward the packet based on the destination information of the packet or send the packet back to service switching gateway 116. Upon receiving the packet back, service switching gateway 116 attaches the tag back to the packet and sends the packet back to switch 112.

Figure 1B:
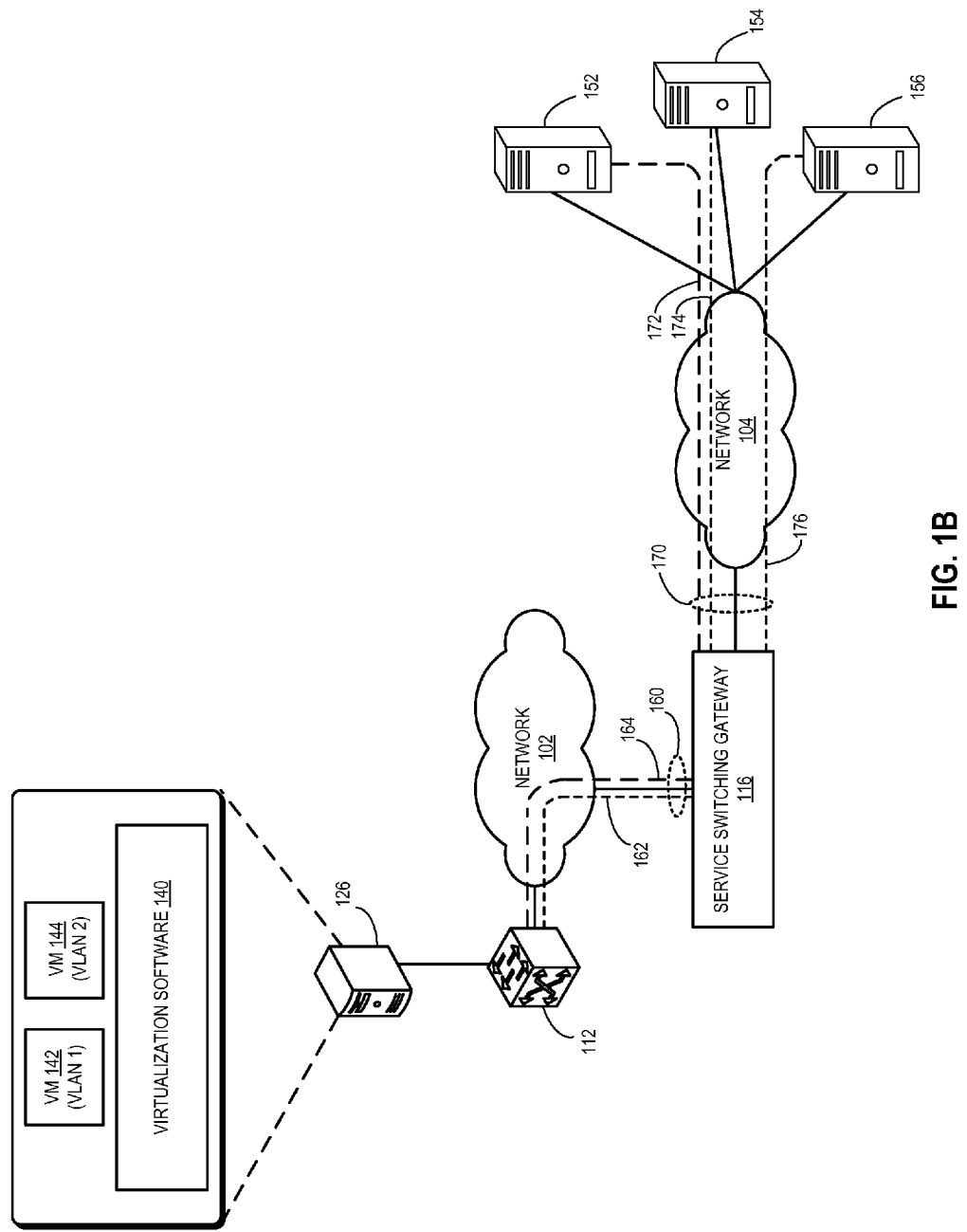
FIG. 1B illustrates encapsulation-based dynamic service switching in conjunction with the example in FIG. 1A.

Note that service switching gateway 116 can have packet encapsulation with switch 112 and service 152 using different encapsulation mechanisms. Service switching gateway 116 uses the service tag in the tunnel encapsulation to switch/steer the packet to corresponding service portal 152. FIG. 1B illustrates encapsulation-based dynamic service switching in conjunction with the example in FIG. 1A. In the example in FIG. 1B, during operation, switch 112 receives packets from virtual machines 142 and 144, which belong to different clients (denoted by different VLANs). Switch 112 establishes one or more forwarding encapsulation tunnels 160 with service switching gateway 116 for forwarding packets from virtual machines 142 and 144. An encapsulation tunnel encapsulates a packet between the origination and termination points of the tunnel.

In some embodiments, based on the customer requirements, service policies specify whether to use the same tunnel for multiple clients or use different tunnels for different clients. Consequently, switch 112 and service switching gateway 116 can have different tunnels for different clients based on the service policies. For example, switch 112 forwards packets from virtual machine 142 via tunnel 162 while forwards packets from virtual machine 144 via tunnel 164. Tunnel 162 and 164 can be based on different encapsulation mechanisms, wherein the service tag formats for tunnel 162 and 164 correspond to the respective encapsulation mechanism. For example, if tunnel 162 is an IPSec tunnel while tunnel 164 is a GRE tunnel, the service tags for all packets forwarded via tunnel 162 are IPSec SPIs and for all packets forwarded via tunnel 164 are GRE keys.

On the other hand, service switching gateway 116 establishes one or more service encapsulation tunnels 170 with service portals 152, 154, and 156 for forwarding packets based on their service requirements. In some embodiments, based on the encapsulation mechanisms supported by a respective service portal, service policies specify which encapsulation mechanism to use for establishing an encapsulation tunnel with a service portal. Service switching gateway 116 and service portals 152, 154, and 156 have tunnels 172, 174, and 176, respectively, between them. Tunnels 172, 174, and 176 can be based on different encapsulation mechanism. For example, tunnel 172 can be a GRE tunnel while tunnels 174 and 176 can be IPSec tunnels.

During operation, switch 112 receives a packet, which requires a service from service portal 152, from virtual machine 142. Switch 112 creates a service tag, which is an IPSec SPI, specifying the source client to which virtual machine 142 belongs. The service tag can also include a requested service, which is the service provided by service portal 152. Switch 112 then encapsulates the packet in IPSec tunneling format, includes the generated IPSec SPI in the encapsulation, and forwards the encapsulated packet to service switching gateway 116 via tunnel 162. Intermediate networking devices in network 102 forwards the packet based on the encapsulation. Upon receiving the encapsulated packet, service switching gateway 116 decapsulates the packet, extracts the IPSec SPI (i.e., the service tag), and identifies the source client and/or the requested service.

In some embodiments, service switching gateway 116 maintains a service mapping between the requested service and/or the source client, and the associated service portal 152. Based on the service mapping, identified the source client, and/or requested service, service switching gateway 116 determines service portal 152 as the service destination. Service switching gateway 116 then encapsulates the packet in GRE tunneling format and forwards the encapsulated packet to service portal 152 via tunnel 172. Upon receiving the encapsulated packet, service portal 152 decapsulates the packet and provides the requested service to the packet. In some embodiments, service switching gateway 116 specifies the requested service by regenerating the service tag as a GRE key and incorporates the GRE key in the packet encapsulation. Upon receiving the packet, service portal 152 extracts the service tag and identifies the requested service for the packet. This can be useful when service portal 152 can provide multiple services.

Figure 2:
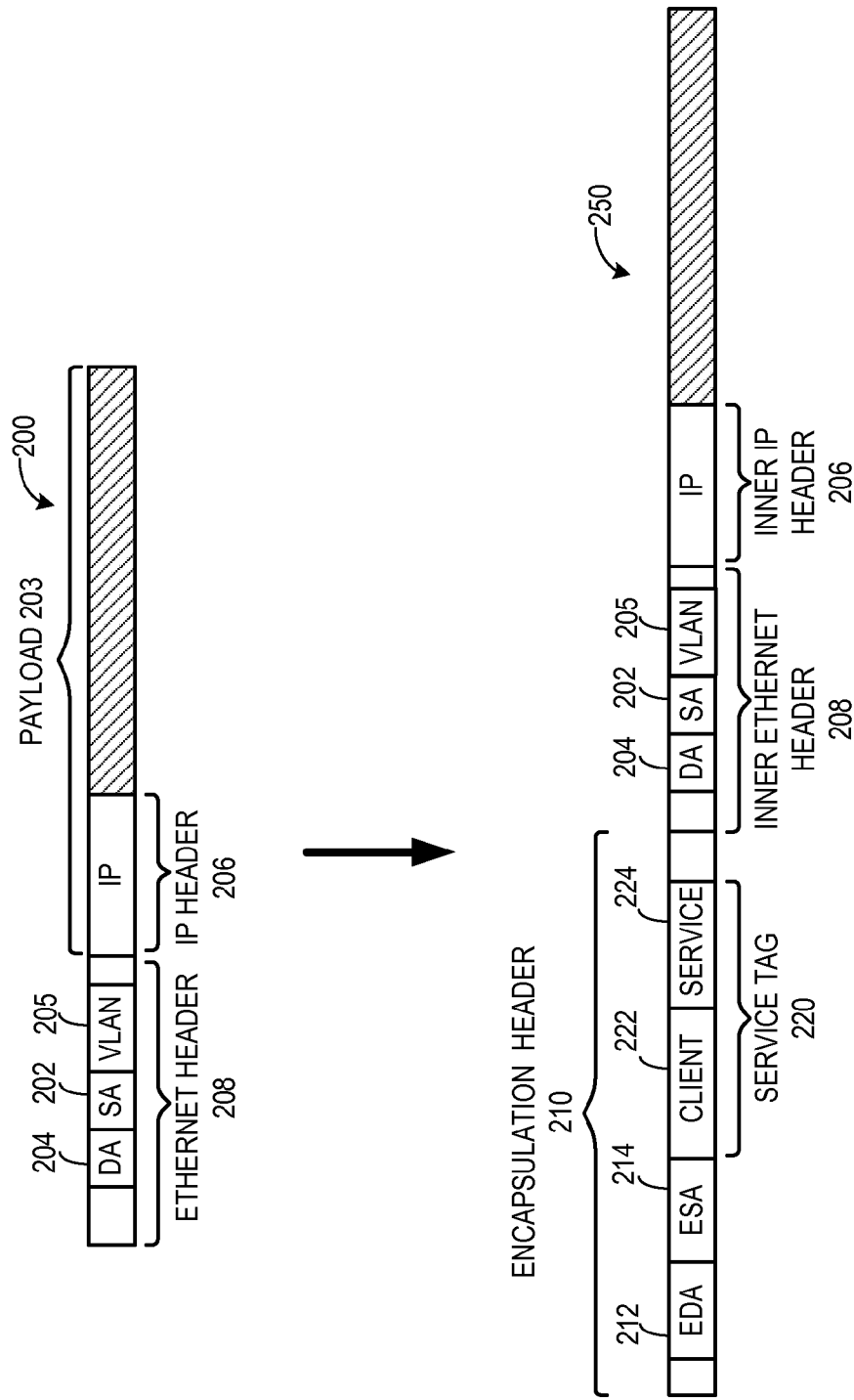
FIG. 2 illustrates header format for a conventional packet and its tunnel encapsulation of dynamic service switching.

FIG. 2 illustrates header format for a conventional packet and its tunnel encapsulation of dynamic service switching. In this example, a conventional Ethernet packet 200 typically includes a payload 203 and an Ethernet header 208. Typically, payload 203 can include an IP packet which includes an IP header 206. Ethernet header 208 includes a media access control (MAC) destination address (DA) 204, a MAC source address (SA) 202, and optionally a VLAN tag 205.

In one embodiment, switch 112 can encapsulate conventional packet 200 into an encapsulated packet 250. Encapsulated packet 250 typically includes an encapsulation header 210, which corresponds to the encapsulation mechanism. Encapsulation header 210 contains an encapsulation DA 212 and an encapsulation SA 214. The encapsulated packet is forwarded via network 102 based on encapsulation DA 212. Encapsulation header 210 also includes a service tag 220, which indicates the source client 222, a requested service 224 for packet 200, or both. For example, if encapsulation header 210 corresponds to an IPSec tunnel, a GRE tunnel, or a VLAN encapsulation, service tag 220 is an IPSec SPI, a GRE key, or a VLAN tag, respectively.

Take, for example, packet 200 is a web request to a web server generated by virtual machine 142. Typically, an upper layer application in virtual machine 142 generates an IP packet destined for the web server, using web server's IP address. This IP packet becomes payload 203, and the web server's IP address becomes the destination IP address in IP header 206. In addition, virtualization software 140's IP address becomes the source IP address in IP header 206. The layer-2 in virtual machine 142 then generates Ethernet header 208 to encapsulate payload 203. MAC DA 204 of Ethernet header 208 is assigned the default gateway router's MAC address. For example, if switch 112 is the gateway router, MAC DA 204 of Ethernet header 208 is switch 112's MAC address. MAC SA 202 of Ethernet header 208 is virtual machine 142's MAC address. Virtual machine 142 then sends Ethernet packet 200 to switch 112.

When switch 112 receives Ethernet packet 200 from virtual machine 142, switch 112 inspects the Ethernet MAC DA 204, MAC SA 202, VLAN tag 205, and optionally IP header 206 and its payload (e.g., the layer-4 header). Based on this information, switch 112 determines that Ethernet packet 200 is associated with web service and requires a service from service portal 152. Subsequently, switch 112 assembles the encapsulation header 210, attaches service tag 220 (corresponding to an encapsulation mechanism), and forwards packet 220 to service switching gateway 116. Upon receiving packet 220, service switching gateway 116 removes encapsulation header 210 and extracts service tag 220. Service switching gateway 116 then assembles another encapsulation header for the packet and forwards the encapsulated packet to service portal 152.

Figure 3:
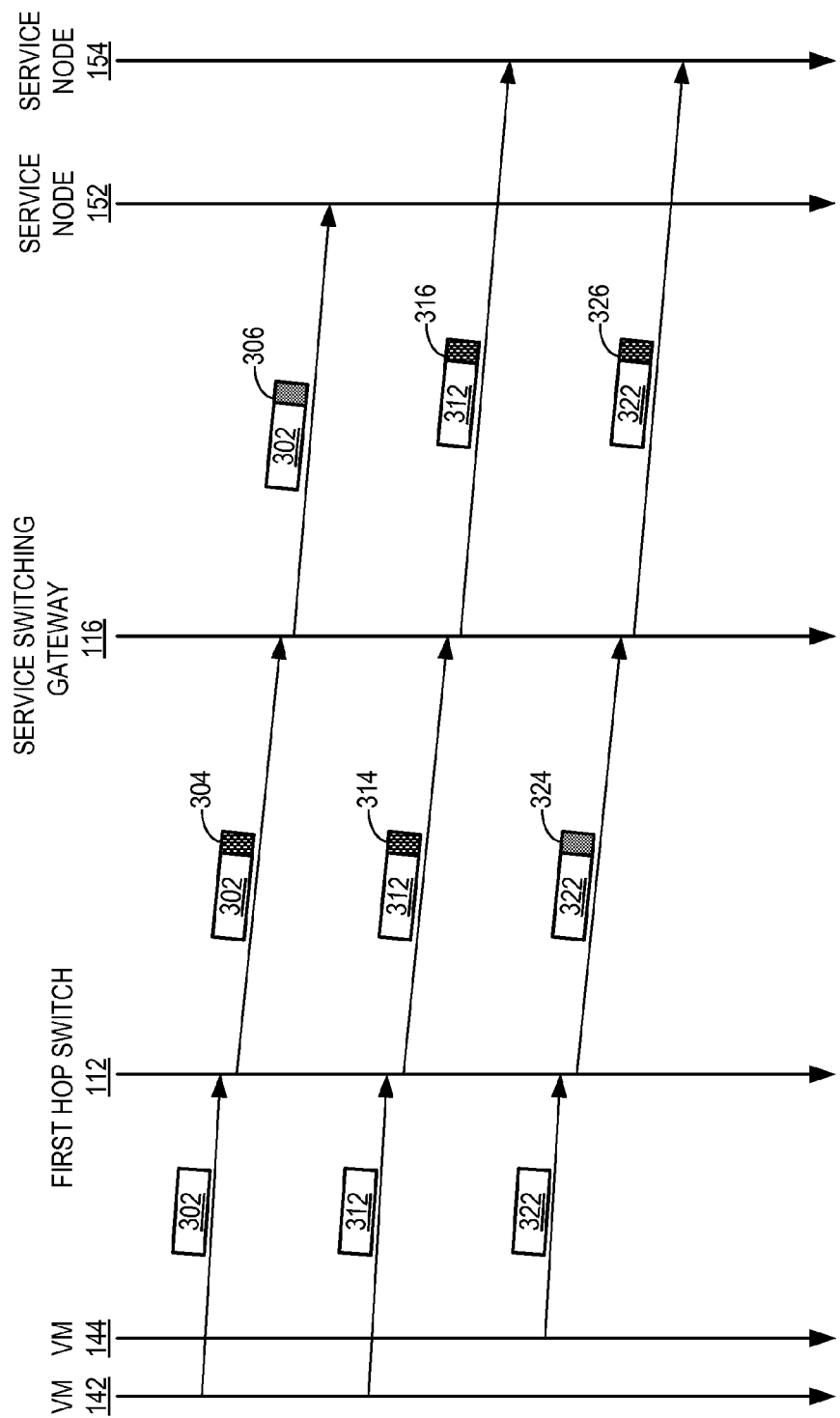
FIG. 3 presents a time-space diagram illustrating an exemplary dynamic service switching process in a datacenter environment.

As mentioned above, when virtual machine 142 sends a packet to the web server, the packet is switched to a service portal. FIG. 3 presents a time-space diagram illustrating an exemplary dynamic service switching process in a datacenter environment. During operation, switch 112 receives packet 302, which requires a service from service portal 152, from virtual machine 142. Switch 112 creates a service tag specifying the source client to which virtual machine 142 belongs and a requested service, which is the service provided by service portal 152. Switch 112 then encapsulates packet 302 in encapsulation header 304, includes the generated service tag in encapsulation header 304, and forwards encapsulated packet 302 to service switching gateway 116. Upon receiving encapsulated packet 302, service switching gateway 116 decapsulates packet 302, extracts the service tag from encapsulation header 304, and identifies the source client and/or the requested service. Based on the identified the source client and/or the requested service, service switching gateway 116 determines service portal 152 as the service destination. Service switching gateway 116 then encapsulates packet 302 in another encapsulation header 306 and forwards encapsulated packet 302 to service portal 152. Note that encapsulation headers 304 and 306 can be based on different encapsulation mechanism.

Switch 112 can receive another packet 312, which requires a service from service portal 154, from virtual machine 142. Switch 112 encapsulates packet 312 in encapsulation header 314, includes a corresponding service tag in encapsulation header 314, and forwards encapsulated packet 312 to service switching gateway 116. However, based on the service policies associated with a client, switch 112 can use a different encapsulation mechanism for that client. In this example, when switch 112 receives packet 322, which requires a service from service portal 154, from virtual machine 144 belonging to a different client, switch 112 encapsulates packet 322 in encapsulation header 324, which is based on a different encapsulation mechanism than encapsulation headers 304 and 314. Switch 112 then includes a corresponding service tag in encapsulation header 324, and forwards encapsulated packet 322 to service switching gateway 116.

Upon receiving encapsulated packets 312 and 322, service switching gateway 116 decapsulates packets 312 and 322, extracts the service tag from encapsulation headers 314 and 324, respectively, and identifies the source client and/or the requested service. Based on the identified the source client and/or the requested service and a service mapping, service switching gateway 116 determines service portal 154 as the service destination. Service switching gateway 116 then encapsulates packets 312 and 322 in encapsulation headers 316 and 326, respectively, and forwards encapsulated packets 312 and 322 to service portal 154. Encapsulation headers 304 and 306 can be based on the same encapsulation mechanism even though they are generated at different locations.

Figure 4A:
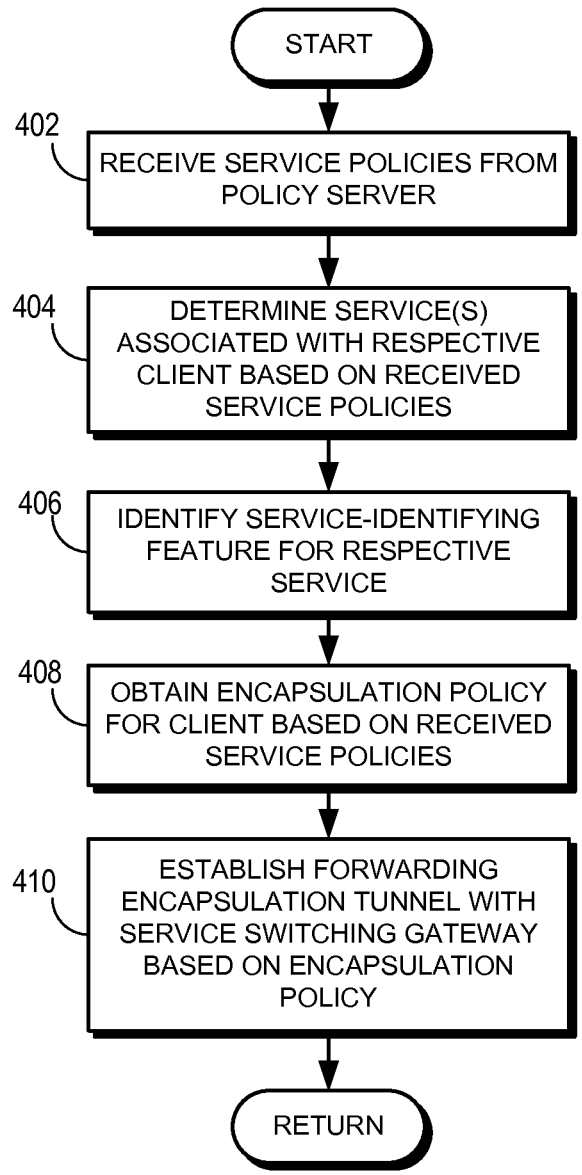
FIG. 4A presents a flow chart illustrating an exemplary process of an origination switch configuring forwarding policies in a datacenter environment based on service requirements.

FIG. 4A presents a flow chart illustrating an exemplary process of an origination switch configuring forwarding policies in a datacenter environment based on service requirements. During operation, the switch receives service policies from a policy server (operation 402), as described in conjunction with FIG. 1A. The switch then determines the service(s) associated with a respective client based on the received service policies (operation 404). The switch also identifies service-identifying features of a respective service (operation 406). For example, service-identifying feature of web filtering can be determining whether a packet includes a destination TCP port 80. The switch obtains encapsulation policy for a respective client based on the received service policies (operation 408). An encapsulation policy dictates the supported encapsulation mechanisms, and which mechanism should be used under which circumstance. For example, a client may require a separate tunnel for forwarding its packets, as described in conjunction with FIG. 1B. The switch then establishes a forwarding encapsulation tunnel with a service switching gateway based on the encapsulation policy (operation 410).

Figure 4B:
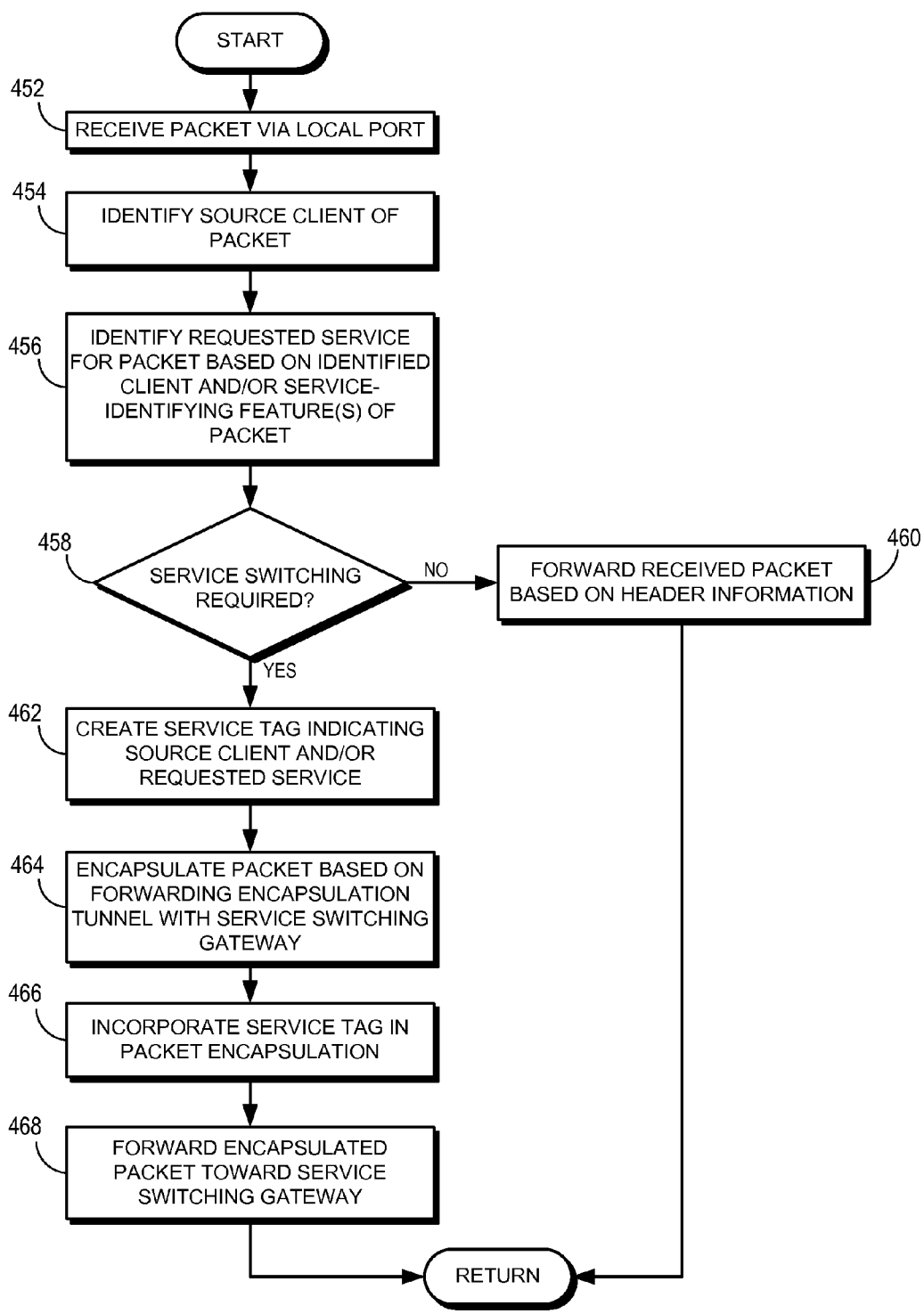
FIG. 4B presents a flow chart illustrating an exemplary process of an origination switch forwarding a packet in a datacenter environment.

FIG. 4B presents a flow chart illustrating an exemplary process of an origination switch forwarding a packet in a datacenter environment. Upon receiving a packet via a local port (operation 452), the switch identifies the source client of the packet (operation 454). In some embodiments, the switch detects the source client based on membership to a VLAN, an associated subnet and a corresponding IP address range, a source (physical or virtual) port, or any point of attachment with the client. The switch then identifies the service requested for the packet based on the identified client and service-identifying feature(s) of the packet (operation 456). The switch then checks whether the packet requires service switching based on the service policies, as described in conjunction with FIG. 4A (operation 458).

If the packet requires service switching, the switch creates a service tag indicating the source client and/or the requested service for the packet (operation 462). The switch encapsulates the packet based on the forwarding tunnel with a service switching gateway (operation 464). Note that this forwarding tunnel can be client-specific. The switch incorporates the service tag in the packet encapsulation (operation 466) and forwards the encapsulated packet toward the service switching gateway (operation 468). If the packet does not require service switching, the switch forwards the packet based on its header information (operation 460).

Figure 5A:
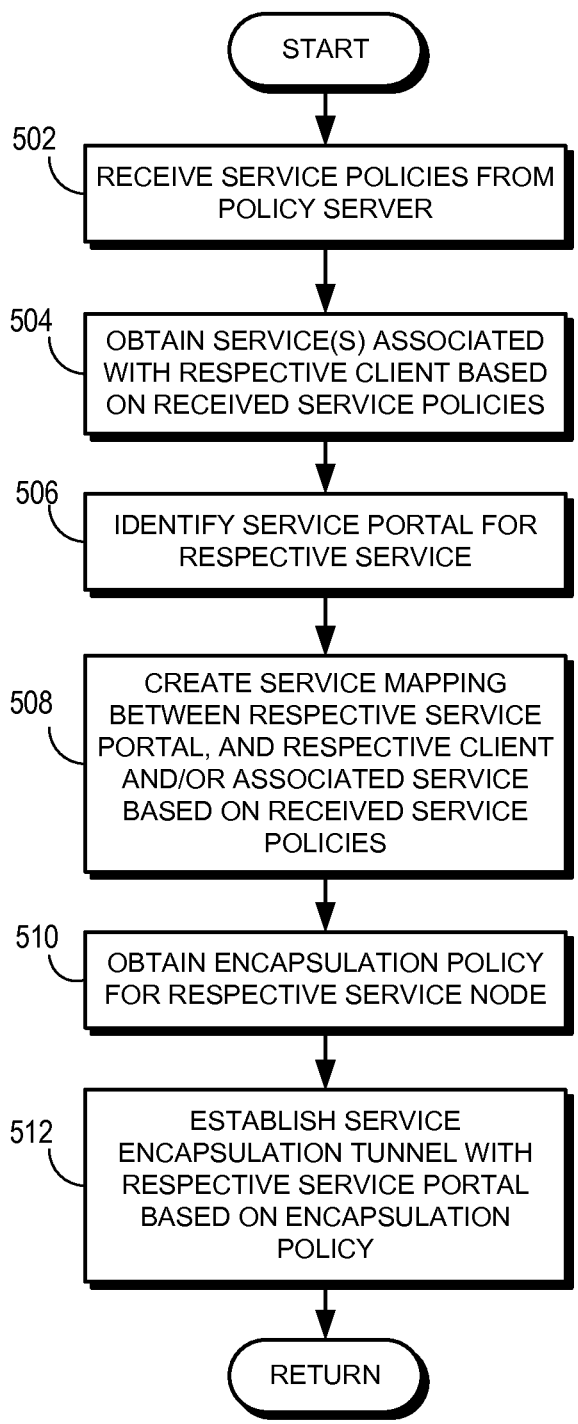
FIG. 5A presents a flow chart illustrating an exemplary process of a service switching gateway configuring service switching policies in a datacenter environment.

FIG. 5A presents a flow chart illustrating an exemplary process of a service switching gateway configuring service switching policies in a datacenter environment. During operation, the service switching gateway receives service policies from a policy server (operation 502), as described in conjunction with FIG. 1A. The service switching gateway then determines the service(s) associated with a respective client based on the received service policies (operation 504). The service switching gateway identifies service portal for a respective service (operation 506) and creates a service mapping between a respective service portal and a respective client and/or associated service based on the received service policies (operation 508). The service switching gateway obtains encapsulation policy for a respective service portal (operation 510) and establishes a service encapsulation tunnel with a respective service portal based on the encapsulation policy (operation 512).

Figure 5B:
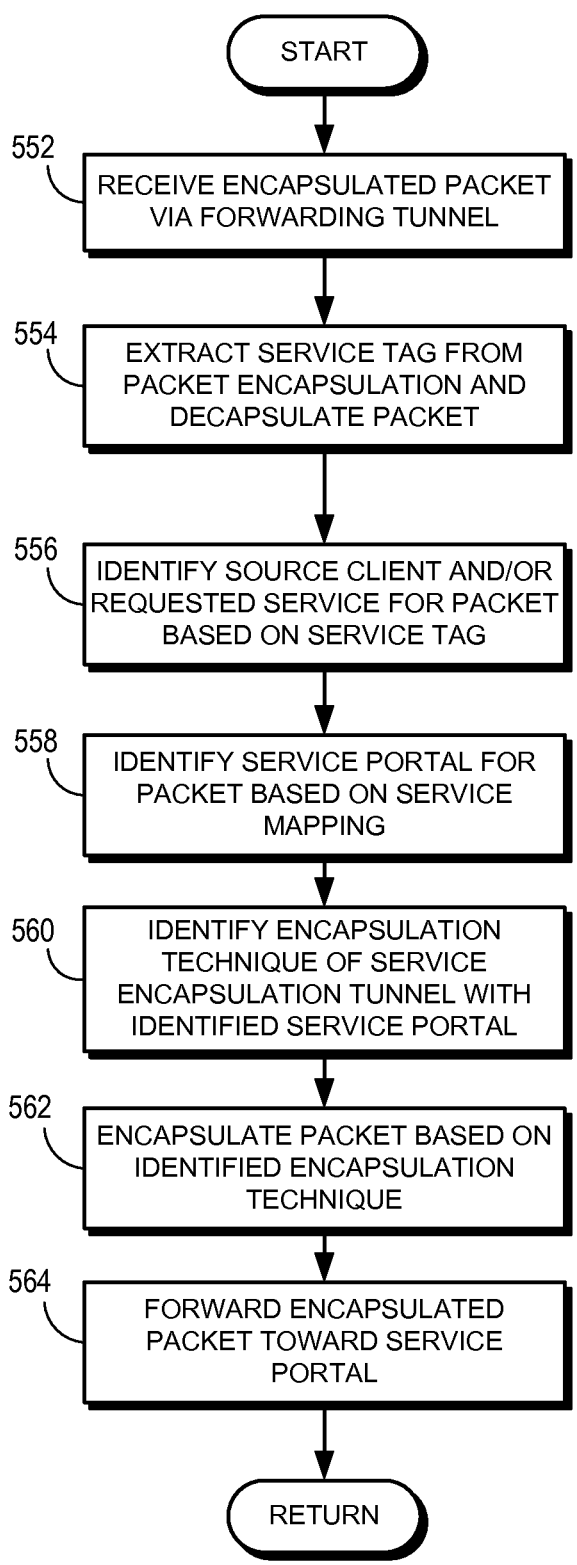
FIG. 5B presents a flow chart illustrating an exemplary process of a service switching gateway forwarding a packet in a datacenter environment based on service requirements.

FIG. 5B presents a flow chart illustrating an exemplary process of a service switching gateway forwarding a packet in a datacenter environment based on service requirements. Upon receiving a packet via a forwarding tunnel (operation 552), the service switching gateway extracts the service tag from the packet encapsulation and decapsulate the packet (operation 554) and identifies the source client and/or a requested service associated with the packet based on the service tag (operation 556). The service switching gateway identifies the service portal for the packet based on the service mapping in the service switching gateway (operation 558) and the encapsulation mechanism of service encapsulation tunnel with the identified service portal (operation 560). Note that this service encapsulation tunnel can be service-specific. The switch encapsulates the packet based on the identified encapsulation mechanism (operation 562) and forwards the encapsulated packet toward the identified service portal (operation 564).

Figure 6:
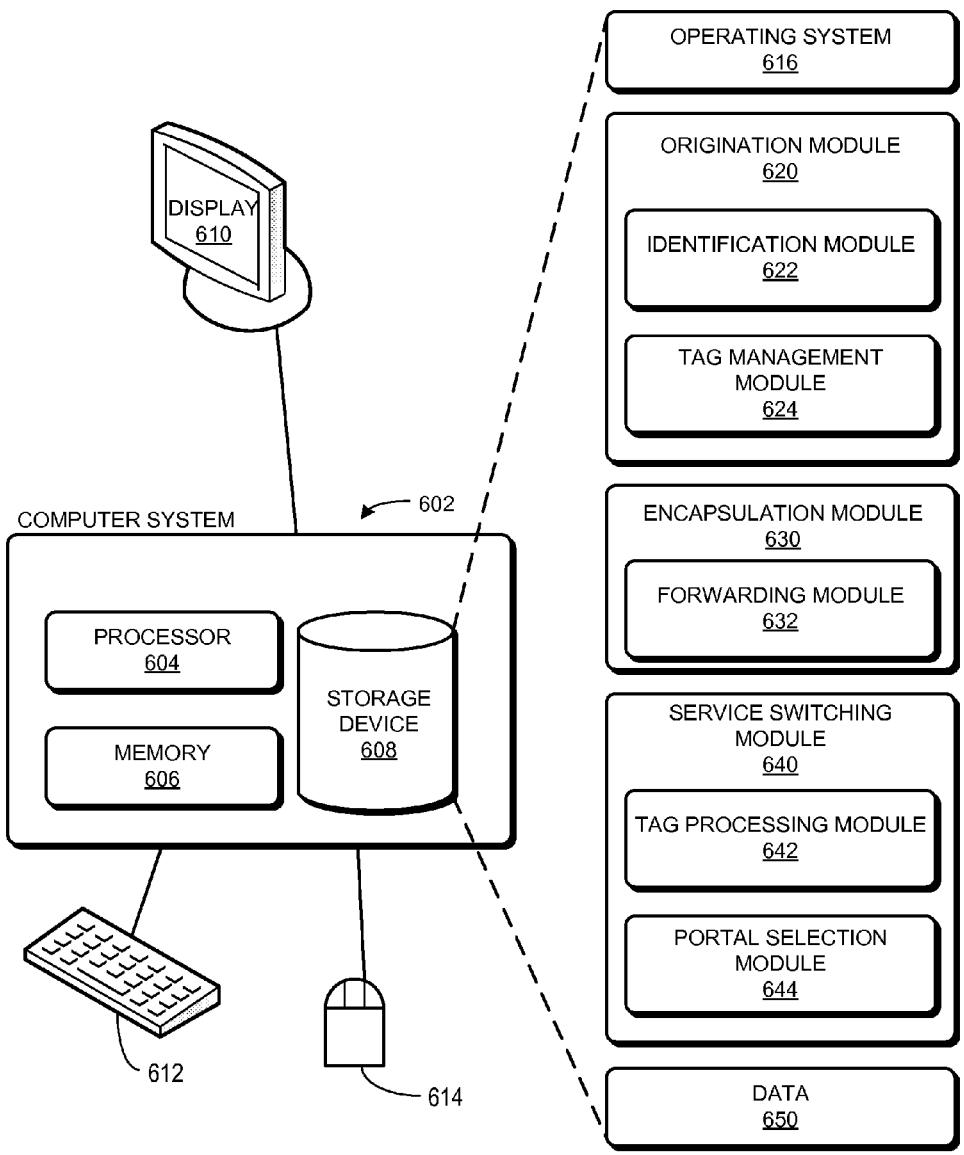
FIG. 6 illustrates an exemplary service switching gateway.

It should be noted that the service switching gateway described herein can be implemented as a stand-alone appliance, as part of a switch or router, or as part of a host machine. Furthermore, the service switching gateway can be implemented in hardware or software, or a combination of both. FIG. 6 illustrates an exemplary service switching gateway. In this example, a computer system 602 includes a processor 604, memory 606, and a storage device 608. Computer system 602 is also coupled to a display 610, a keyboard 612, and a pointing device 614. Storage device 608 stores data 650 and instructions which when loaded into memory 606 and executed by processor 604 implement an operating system 616, an origination module 620, an encapsulation module 630, and an service switching module 640. Origination module 620 includes an identification module 622 and a tag management module 624. Encapsulation module 630 includes a forwarding module 632. Service switching module 640 includes a tag processing module 642 and a portal selection module 644. When executed by the processor, these modules jointly or separately perform the functions described above.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method comprising:
identifying a source client and a requested service associated with a packet;
encapsulating the packet for a particular tunnel with a header that comprises a source client identifier identifying the source client and a service identifier identifying the requested service; and
forwarding the encapsulated packet to a service switching gateway, said service switching gateway (i) extracting the source-client identifier and the service identifier from the header, (ii) from a plurality of service policies, selecting a particular service policy based on the extracted source-client and service identifiers, said selected service policy specifying a particular switching operation, and (iii) performing the particular switching operation on the packet, wherein at least two different service policies for two different source clients specify the same switching operation, and at least two different service policies for two other different source clients specify different switching operations.

2. The method of claim 1, wherein the service tag is identifier comprises one or more of: a GRE key, an IPSec Security Parameter Index (SPI), a VLAN tag, and IP header options.

3. The method of claim 1, wherein the encapsulation is based on one or more of:
Generic Routing Encapsulation (GRE) tunneling;
Internet Protocol Security (IPsec) tunneling;
Virtual Local Area Network (VLAN) encapsulation; and
Internet Protocol (IP) encapsulation.

4. The method of claim 1, wherein the particular switching operation of the packet is client-specific as the switching operation is based on the source client identifier.

5. A method comprising:
receiving, at a service switching gateway, an encapsulated packet comprising an encapsulation header that includes a source identifier identifying a source machine for the packet and a service identifier identifying the requested service;

extracting, from the encapsulated packet, the source and service identifiers;

from a plurality of service policies, selecting a particular service policy based on the extracted source and service identifiers, said selected service policy specifying a particular forwarding operation to perform; and based on the particular forwarding operation, forwarding the packet to a service portal, wherein at least two different service policies for two different source clients specify the same forwarding operation, and at least two different service policies for two other different source clients specify different forwarding operations.

6. The method of claim 5, further comprising maintaining a mapping between the service portal and one or more of a source machine;

a requested service;

the service identifier; and a tunnel encapsulation.

7. The method of claim 5, wherein the received packet is a first received packet, the method further comprising:

receiving a second packet from the service portal to which the first packet was forwarded; and reconstructing the service identifier and the source identifier for the second packet based on the selected service policy.

8. The method of claim 7, wherein the second received packet is encapsulated, wherein the encapsulation of the second packet specifies the service switching gateway as the destination address of the second packet.

9. The method of claim 5, wherein the service identifier comprises one or more of: a GRE key, an IPSec Security Parameter Index (SPI), a VLAN tag, and IP header options.

10. The method of claim 5, wherein the particular forwarding operation of the packet is client-specific as the switching operation is based on the source client identifier.

11. The method of claim 1, wherein the method is performed at a first-hop switch connected to a machine from which the packet originates.

12. The method of claim 11, wherein the first-hop switch is a switch that executes on a host computer, said host computer executing the machine from which the packet originates.

13. A non-transitory machine readable medium storing a program comprising sets of instructions for:

identifying a source client and a requested service associated with a packet;

encapsulating the packet for a particular tunnel with a header that comprises a source client identifier identifying the source client and a service identifier identifying the requested service; and forwarding the encapsulated packet to a service switching gateway, said service switching gateway (i) extracting the source-client identifier and the service identifier from the header, (ii) from a plurality of service policies, selecting a particular service policy based on the extracted source-client and service identifiers, said selected service policy specifying a particular switching operation, and (iii) performing the particular switching operation on the packet, wherein at least two different service policies for two different source clients specify the same switching operation, and at least two different service policies for two other different source clients specify different switching operations.

14. The non-transitory machine readable medium of claim 13, wherein the service identifier comprises one or more of: a GRE key, an IPSec Security Parameter Index (SPI), a VLAN tag, and IP header options.

15. The non-transitory machine readable medium of claim 13, wherein the particular switching operation of the packet is client-specific as the switching operation is based on the source client identifier.

16. The non-transitory machine readable medium of claim 13, wherein the program is executed at a first-hop switch connected to a machine from which the packet originates.

17. The non-transitory machine readable medium of claim 16, wherein the first-hop switch is a switch that executes on a host computer, said host computer executing the machine from which the packet originates.

* * * * *